(12) United States Patent
Betté

(10) Patent No.: US 8,609,766 B2
(45) Date of Patent: Dec. 17, 2013

(54) POLYMER COMPOSITIONS

(75) Inventor: Cristiano Betté, Richterswill (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/695,105

(22) PCT Filed: Jun. 23, 2011

(86) PCT No.: PCT/EP2011/060542
§ 371 (c)(1),
(2), (4) Date: Oct. 29, 2012

(87) PCT Pub. No.: WO2012/000877
PCT Pub. Date: Jan. 5, 2012

(65) Prior Publication Data
US 2013/0096259 A1 Apr. 18, 2013

(30) Foreign Application Priority Data
Jun. 30, 2010 (IT) .................. MI10A1182

(51) Int. Cl.
*C08L 75/14* (2006.01)
*C08L 75/04* (2006.01)
*C08L 53/00* (2006.01)
*C08L 53/02* (2006.01)
*C08G 61/08* (2006.01)

(52) U.S. Cl.
USPC ........ 525/92 C; 525/92 R; 525/123; 525/125; 525/185; 525/915

(58) Field of Classification Search
USPC .............. 525/92 C, 123, 125, 185, 92 R, 915
See application file for complete search history.

(56) References Cited

U.S. PATENT DOCUMENTS

| | | | |
|---|---|---|---|
| 4,523,005 A | 6/1985 | Szycher | |
| 4,631,329 A | 12/1986 | Gornowicz et al. | |
| 4,677,133 A * | 6/1987 | Leicht ............................. | 521/51 |
| 5,241,004 A | 8/1993 | Kopytko | |
| 5,272,236 A | 12/1993 | Lai et al. | |
| 5,278,272 A | 1/1994 | Lai et al. | |
| 5,714,426 A | 2/1998 | Tsutsui et al. | |
| 6,106,952 A | 8/2000 | Yamashita et al. | |
| 6,740,711 B1 | 5/2004 | Lipman et al. | |
| 7,608,668 B2 | 10/2009 | Shan et al. | |
| 2006/0199931 A1 | 9/2006 | Poon et al. | |
| 2010/0010171 A1* | 1/2010 | Ding et al. .................. | 525/92 C |

FOREIGN PATENT DOCUMENTS

| | | |
|---|---|---|
| EP | 0994919 A1 | 4/2000 |
| EP | 1902865 A1 | 3/2008 |
| WO | 99/02603 A1 | 1/1999 |
| WO | 2005/090427 A1 | 9/2005 |
| WO | 2008/057881 A2 | 5/2008 |

OTHER PUBLICATIONS

PCT/EP2011/060542 International Search Report.

* cited by examiner

*Primary Examiner* — Fred M Teskin

(57) ABSTRACT

The invention provides a composition comprising at least the following: A) a thermoplastic polyurethane; B) an elastomer; C) a polydiene-based polyurethane or a polydiol-based polyurethane; D) a polyoctenamer; and E) a resin selected from the group consisting of the following: i) an indene-coumarone resin, ii) an aromatic hydrocarbon resin, and iii) an aliphatically modified aromatic hydrocarbon resin.

16 Claims, No Drawings

POLYMER COMPOSITIONS

REFERENCE TO RELATED APPLICATIONS

This application claims the benefit of Italian Patent Application No. MI2010A001182, filed Jun. 30, 2010, and fully incorporated herein.

BACKGROUND OF INVENTION

Thermoplastic polyurethane (TPU)/SBS compatibilized blends have been developed for injectable shoe soles. International Publication No. WO 2008/057881 discloses such compatibilized blends for the manufacturer of articles with good mechanical properties. However, when these blends contain a high amount of the SBS (for example, greater than 20 weight percent), the melt flow index (MFI) typically decreases to values less than 15 g/10 min (5.0 kg, 190° C.), which, in turn, makes the injection molding of such blends very difficult. A common method to increase a composition's MFI is to add oil, or to substitute a part of the dry rubber with a lower viscosity, oil-extended rubber, or with a low molecule weight polymer. However, although these methods improve the MFI, they do not improve, or can even make worse, other properties, like tensile strength, abrasion resistance, and/or tear resistance.

International Publication No. WO 2008/057881 discloses compositions comprising the following: a) at least one olefin-based polymer, at least one halogenated ethylene-based polymer, or at least one elastomer rubber, b) at least one thermoplastic polyurethane, and c) a polydiene-based polyurethane. These compositions can be used to promote adhesion between polar and nonpolar materials, and for the manufacture of articles, such as, films, fibers, sheets, tie layers, tubes, adhesives, dispersions, protective apparel, footwear, coatings, laminates and foams.

U.S. Pat. No. 5,241,004 discloses a sheet or molded article formed from a thermoplastic material comprising the following: a polyurethane, a polyvinyl acetate, and a component selected from an additional thermoplastic material, an elastomer-modified thermoplastic material, a rubber, or combinations thereof. The material is disclosed as having improved melt strength.

U.S. Pat. No. 6,106,952 discloses a thermoplastic polymer composition containing the following: a) 100 parts of a block copolymer comprising an aromatic vinyl block and a conjugated diene block, b) 5 to 200 parts of a polyurethane block copolymer having a thermoplastic polyurethane block, c) 10 to 300 parts of a thermoplastic polyurethane, and d) 10 to 300 parts of a paraffin oil. The composition is used to form laminate structures.

U.S. Pat. No. 6,740,711 discloses a pressure sensitive, hot melt adhesive composition comprising one or more pressure-sensitive, adhesive matrices and at least 0.5 weight percent of a trans-polyoctenamer. The composition can be used for medical, consumer and industrial products.

European Patent Application No. 1902865A1 discloses a pneumatic tire having a rubber component that includes the following: a) 100 parts by weight (phr) of a rubber containing olefin unsaturation, b) from 50 to 120 phr of silica, and c) from 1 to 40 phr of a polyoctenamer. The rubber composition is disclosed as having improved abrasion resistance.

There remains a need for injectable elastomeric compositions for footwear components, such as shoe outsoles, with improved processability, and maintained, or improved, mechanical properties, such as abrasion resistance. There is a further need for such compositions that have an improved balance of processability (as measured by an increased MFI), and abrasion resistance, while not sacrificing other important mechanical properties. These needs and others have been met by the following invention.

SUMMARY OF INVENTION

The invention provides a composition comprising at least the following:
A) a thermoplastic polyurethane;
B) an elastomer;
C) a polydiene-based polyurethane or a polydiol-based polyurethane;
D) a polyoctenamer; and
E) a resin selected from the group consisting of the following:
 i) an indene-coumarone resin,
 ii) an aromatic hydrocarbon resin, and
 iii) an aliphatically modified aromatic hydrocarbon resin.

DETAILED DESCRIPTION

As discussed above, the invention provides a composition comprising at least the following:
A) a thermoplastic polyurethane;
B) an elastomer;
C) a polydiene-based polyurethane or a polydiol-based polyurethane;
D) a polyoctenamer; and
E) a resin selected from the group consisting of the following:
 i) an indene-coumarone resin,
 ii) an aromatic hydrocarbon resin, and
 iii) an aliphatically modified aromatic hydrocarbon resin.

It has been unexpectedly discovered that the inventive compositions have higher MFI values, and significantly better abrasion resistance, as compared to conventional compositions.

The thermoplastic polyurethane (Component A) has no limitation in respect of its formulation, other than (i) it is different from the polydiene-based polyurethane or the polydiol-based polyurethane of component C), as described herein, in one or more of chemical composition, density and melt index ($I_2$), and (ii) it is thermoplastic in nature.

In one embodiment, the composition has an MFI greater than, or equal to, 10, preferably greater than, or equal to 15 and more preferably greater than, or equal to 20, g/10 min (190° C., 5.0 kg load).

In one embodiment, the composition has a melt flow index (MFI) from 10 to 100, preferably from 12 to 80, and more preferably from 15 to 60 and even more preferably from 20 to 50, g/10 min (190° C., 5.0 kg load).

In one embodiment, the compositions has a density greater than, or equal to, 0.92, preferably greater than, or equal to, 0.96 and more preferably greater than, or equal to, 1.00 grams per cubic centimeter (g/cm3 or g/cc). Density can be measured using ISO 1183.

In one embodiment, the composition has a density less than or equal to 1.20, preferably less than or equal to 1.15, more preferably less than or equal to 1.10 g/cc.

In one embodiment, the composition has a density from 0.92 to 1.20, preferably from 0.96 to 1.15 and more preferably from 1.00 to 1.10 g/cc.

In one embodiment, the composition has an abrasion resistance less than, or equal to, 60, preferably less than, or equal to, 55, more preferably less than, or equal to, 50 mm$^3$ (DIN 53516).

In one embodiment, the composition has a Hardness Shore A greater than, or equal to, 60, preferably greater than, or equal to, 65 (DIN 53505).

In one embodiment, the composition has a tensile strength greater than, or equal to, 12, preferably greater than, or equal to, 15 MPa (DIN 53504).

In one embodiment, the composition has a elongation at break greater than, or equal to, 600, preferably greater than, or equal to, 650 percent (DIN 53504).

In one embodiment, the polyurethane of Component A is present in an amount from 10 to 90, preferably from 20 to 80, more preferably from 30 to 70, and even more preferably from 40 to 60 weight percent, based on the weight of the composition.

In one embodiment, the elastomer of Component B is present in an amount from 10 to 90, preferably from 30 to 80, more preferably from 40 to 70, and even more preferably from 50 to 60 weight percent, based on the weight of the composition.

In one embodiment, the polydiene-based polyurethane or polydiol-based polyurethane of Component C is present in an amount from 0.1 to 20, preferably from 1 to 15, more preferably from 2 to 10, and even more preferably from 4 to 6 weight percent, based on the weight of the composition.

In one embodiment, the polyoctanemer of Component D is present in an amount from 0.1 to 30, preferably from 1 to 20, more preferably from 2 to 15, and even more preferably from 5 to 10 weight percent, based on the weight of the composition.

In one embodiment, the resin of Component E is present in an amount from 0.1 to 30, preferably from 1 to 20, more preferably from 2 to 15, and even more preferably from 3 to 8 weight percent, based on the weight of the composition.

In one embodiment, the inventive composition comprises one or more additives.

Typically the composition will contain one or more stabilizers, for example, antioxidants, such as IRGANOX 1010 and IRGAFOS 168, both supplied by Ciba Specialty Chemicals. An example of a hindered phenolic antioxidant is IRGANOX 1076 antioxidant, available from Ciba-Geigy Corp. Polymers are typically treated with one or more stabilizers before an extrusion or other melt processes. Other additives include, but are not limited to, ultraviolet light absorbers, antistatic agents, pigments, dyes, nucleating agents, fillers, fire retardants, plasticizers, processing aids, lubricants, stabilizers, smoke inhibitors, viscosity control agents and antiblocking agents. Additional additives include, but not limited to, antistatic agents, release agents, abrasion and scratch mar additives, and antimicrobial agents.

In one embodiment, the inventive composition further comprises a polar polymer selected from the group consisting of polyesters, polyamides, polyethers, polyetherimides, polyvinylalcohols, polycarbonates, polylactic acids, and polyamide esters.

The invention also provides a method of making an inventive composition comprising melt mixing Components A through E. In a further embodiment, the Components A through E are mixed simultaneously. In another embodiment, the Components A through E are mixed sequentially, in any order.

In one embodiment, the melt mixing takes place in an extruder.

In one embodiment, the melt mixing takes place in an "in-line" compounding process.

An inventive composition may comprise a combination of two or more embodiments as described herein.

An inventive method may comprise a combination of two or more embodiments as described herein.

Thermoplastic Polyurethanes (Component A)

Suitable polyurethanes are thermoplastic polyurethanes. In addition to the description below, additional information of such polyurethanes is described in WO 2008/057881, incorporated herein by reference.

The polyurethane component has no limitation in respect of its formulation, other than (i) it is different from the polydiene-based polyurethane or the polydiol-based polyurethane of component C), as described herein, in one or more of chemical composition, density and melt index ($I_2$), and (ii) it is thermoplastic in nature, which means it is prepared from substantially difunctional ingredients, for example, organic diisocyanates and components being substantially difunctional in active hydrogen containing groups. However, sometimes minor proportions of ingredients with functionalities higher than two may be employed. This is particularly true when using extenders such as glycerin, trimethylolpropane, and the like. Such thermoplastic polyurethane compositions are generally referred to as TPU materials. For representative teaching on the preparation of TPU materials see *Polyurethanes: Chemistry and Technology, Part II*, Saunders and Frisch, 1964, pp 767 to 769, Interscience Publishers, New York, N.Y., and *Polyurethane Handbook*, Edited by G. Oertel 1985, pp 405 to 417, Hanser Publications, distributed in U.S.A. by Macmillan Publishing Co., Inc., New York, N.Y. For particular teaching on various TPU materials, and their preparation, see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329; the disclosures of which are incorporated herein by reference.

In one embodiment, the TPU is a polymer prepared from a mixture comprising an organic diisocyanate, at least one polymeric diol and at least one difunctional extender. The TPU may be prepared by the prepolymer method, quasi-prepolymer method, or one-shot method, in accordance with the methods described in the incorporated references above.

The TPU forming ingredients can be reacted in organic solvents, but are preferably reacted, in the absence of solvent, by melt-extrusion, at a temperature of from about 125° C. to about 250° C., preferably from about 160° C. to about 225° C.

It is frequently desirable, but not essential, to include a catalyst in the reaction mixture employed to prepare the compositions of the invention. Any of the catalysts, conventionally employed in the art, to catalyze the reaction of an isocyanate with a reactive hydrogen containing compound, can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960; each incorporated herein by reference.

Di-isocyanates suitable for use in preparing the hard segment of the polyurethanes include aromatic, aliphatic, and cycloaliphatic di-isocyanates, and combinations of two or more of these compounds. An example of a structural unit derived from di-isocyanate (OCN—R—NCO) is represented by formula (I) below:

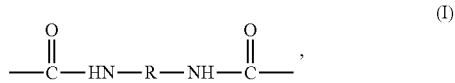

in which R is an alkylene, cycloalkylene, or arylene group. Representative examples of these di-isocyanates can be found in U.S. Pat. Nos. 4,385,133, 4,522,975 and 5,167,899. Preferred di-isocyanates include, but are not limited to, 4,4'-di-isocyanatodiphenylmethane, p-phenylene di-isocyanate, 1,3-bis (isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. A preferred is 4,4'-di-isocyanatodiphenylmethane.

Any of the organic diisocyanates previously employed in TPU preparation can be employed, including, but not limited to, aromatic, aliphatic, and cycloaliphatic diisocyanates, and mixtures thereof. Illustrative isocyanates include, but are not limited to, methylenebis(phenyl isocyanate), including the 4,4'-isomer, the 2,4'-isomer, and mixtures thereof; m-and p-phenylene diisocyanates; chlorophenylene diisocyanates; α,α'-xylylene diisocyanate; 2, 4-and 2,6-toluene diisocyanate, and the mixtures of these latter two isomers, which are available commercially; tolidine diisocyanate; hexamethylene diisocyanate; 1,5-naphthalene diisocyanate; isophorone diisocyanate and the like; cycloaliphatic diisocyanates, such as methylenebis(cyclohexyl isocyanate), including the 4,4'-isomer, the 2,4'-isomer and mixtures thereof, and all the geometric isomers thereof, including trans/trans, cis/trans, cis/cis, and mixtures thereof; cyclohexylene diisocyanates (1,2-; 1,3-; or 1,4-); 1-methyl-2,5-cyclohexylene diisocyanate; 1-methyl-2,4-cyclohexylene diisocyanate; 1-methyl-2,6-cyclohexylene diisocyanate; 4,4'-isopropylidenebis-(cyclohexyl isocyanate); 4,4'-diisocyanatodicyclohexyl, and all geometric isomers and mixtures thereof, and the like.

The polymeric diols which can be used include those conventionally employed for the preparation of TPU elastomers. The polymeric diols are responsible for the formation of soft segments in the resulting polymer, and preferably have molecular weights (number average) falling in the range from 200 to 10,000 g/mole, preferably from 400 to 4,000 g/mole, and, more preferably from 500 to 3,000 g/mole. It is not unusual, and, in some cases, it can be advantageous, to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides, such as ethylene oxide, propylene oxide, and the like, and mixtures, in which any of the above polyols are employed as major component (greater than 50% w/w) with amine-terminated polyethers and amino-terminated polybutadiene-acrylonitrile copolymers. Additional examples of the diols include the natural oil diols.

Suitable polyether polyols include polyoxyethylene glycols, polyoxypropylene glycols, which, optionally, have been capped with ethylene oxide residues; random and block copolymers of ethylene oxide and propylene oxide; polytetramethylene glycol; random and block copolymers of tetrahydrofuran and ethylene oxide and/or propylene oxide; and products derived from any of the above reaction with difunctional carboxylic acids or esters derived from said acids, in which latter case, ester interchange occurs, and the esterifying radicals are replaced by polyether glycol radicals. The preferred polyether polyols are random and block copolymers of ethylene and propylene oxide of functionality about 2.0 and polytetramethylene glycol polymers of functionality about 2.0.

Suitable polyester polyols include those prepared by polymerizing epsilon-caprolactone using an initiator such as ethylene glycol, ethanolamine, and the like; and those prepared by esterification of polycarboxylic acids such as phthalic, terephthalic, succinic, glutaric, adipic azelaic, and the like acids, with polyhydric alcohols, such as ethylene glycol, butanediol, cyclohexanedimethanol, and the like.

Suitable amine-terminated polyethers are the aliphatic primary diamines structurally derived from polyoxypropylene glycols. Polyether diamines of this type were available from Jefferson Chemical Company under the trademark JEFFAMINE (now available from Basell).

The chain extenders may be aliphatic, cycloaliphatic, or aromatic and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclo-hexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

In one embodiment, the extender is selected from the following: 1,4-butanediol, 1,6-hexanediol, neopentyl glycol, 1,4-cyclohexanedimethanol, ethylene glycol, and diethylene glycol, either alone, or in admixture, with each other, or with one or more aliphatic diols previously named. Particularly preferred diols are 1,4-butanediol, 1,6-hexanediol and 1,4-cyclohexanedimethanol.

The chain extenders that may be used in the invention are characterized by two or more, preferably two, functional groups, each of which contains "active hydrogen atoms." These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in J. Am. Chemical Soc., 49, 31-81 (1927).

The chain extender is incorporated into the polyurethane in amounts determined by the selection of the specific reactant components, the desired amounts of the hard and soft segments, and the index sufficient to provide good mechanical properties, such as modulus and tear strength. The polyurethane may contain from 2 to 25, preferably from 3 to 20 and more preferably from 4 to 18, weight percent of the chain extender component, based on the weight of the polyurethane.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

In one embodiment, the polyurethane has a density greater than, or equal to, 0.90 g/cc, preferably greater than, or equal to, 0.95 g/cc, and more preferably greater than, or equal to, 1.00 g/cc. In one embodiment, the polyurethane has a density less than, or equal to, 1.30 g/cc, preferably less than, or equal to, 1.25 g/cc, and more preferably less than, or equal to, 1.20 g/cc. In one embodiment, the polyurethane has a density from 0.90 g/cc to 1.30 g/cc, preferably from 0.95 g/cc to 1.25 g/cc, and more preferably from 1.00 g/cc to 1.20 g/cc. All individual values and subranges from 0.90 g/cc to 1.30 g/cc are included and described herein.

In one embodiment, the polyurethane has a melt index greater than, or equal to, 0.1 g/10 min, preferably greater than, or equal to, 0.5 g/10 min, and more preferably greater than, or equal to, 1 g/10 min (ASTM D-1238-04, 190° C., 2.16 kg). In one embodiment, the polyurethane has a melt index less than, or equal to, 100 g/10 min, preferably less than, or equal to, 50 g/10 min, more preferably less than, or equal to, 20 g/10 min, and even more preferably less than, or equal to, 10 g/10 min (ASTM D-1238-04, 190° C., 2.16 kg). In one embodiment, the polyurethane has a melt index from 0.1 g/10 min to 100 g/10 min, preferably from 0.5 g/10 min to 50 g/10 min, more preferably from 1 g/10 min to 20 g/10 min, and even more preferably from 1 g/10 min to 10 g/10 min.

In one embodiment, the polyurethane has a melt index from 6 g/10 min to 10 g/10 min, and preferably from 7 g/10 min to 9 g/10 min.

In one embodiment, the polyurethane has a Shore A Hardness from 60 to 100, and preferably from 70 to 90, more preferably from 75 to 85.

Polyurethanes include, but are not limited to, PELLETHANE Thermoplastic Polyurethane Elastomers, ESTANE thermoplastic polyurethanes, TECOFLEX thermoplastic polyurethanes, CARBOTHANE thermoplastic polyurethanes, TECOPHILIC thermoplastic polyurethanes, TECOPLAST thermoplastic polyurethanes, and TECOTHANE thermoplastic polyurethanes, all available from Noveon; ELASTOLLAN thermoplastic polyurethanes and other thermoplastic polyurethanes available from BASF; and commercial thermoplastic polyurethanes available from Bayer, Huntsman and Merquinsa.

In one embodiment of the invention, the polyurethane comprises chemical units derived from a polyester, and at least one aromatic diisocyanate or at least one aliphatic diisocyanate.

In one embodiment, the polyurethane comprises chemical units derived from a polyester, and at least one aromatic diisocyanate.

In one embodiment, the polyurethane comprises chemical units derived from a polyester, and at least one aliphatic diisocyanate.

In one embodiment, the polyurethane comprises chemical units derived from a polyester and a mixture of 1,3-bis(isocyanatomethyl)cyclohexane and 1,4-bis(isocyanatomethyl)cyclohexane. In a further embodiment, the weight ratio of the 1,3-bis(isocyanatomethyl)cyclohexane to the 1,4-bis(isocyanatomethyl)cyclohexane is about 1 to 1. In a further embodiment, the polyester is formed from caprolactone.

In one embodiment, the polyurethane comprises a monomer derived from caprolactone.

In one embodiment, the polyurethane comprises a monomer derived from a diol derivative, derived from N-octyl pyrrolidone.

In one embodiment, the polyurethane comprises a monomer derived from polytetramethylene ether glycol.

In one embodiment, the polyurethane comprises a monomer derived from a polyether.

The polyurethane (Component A) may comprise a combination of two or more embodiments as described above.

Elastomer (Component B)

Suitable elastomers include, but are not limited to, elastomeric rubbers, ethylene/propylene/diene interpolymers, ethylene/α-olefin interpolymers, and ethylene multi-block interpolymers.

Elastomeric Rubbers (Component B)

In one embodiment, the elastomer is a butadiene/styrene interpolymer, and preferably a butadiene/styrene copolymer and more preferably a butadiene/styrene block copolymer. In a further embodiment, the butadiene/styrene copolymer, and preferably block copolymer, comprises 20 weight percent styrene, based on the weight of the copolymer.

In one embodiment, the butadiene/styrene interpolymer, and preferably a butadiene/styrene copolymer, and more preferably a butadiene/styrene block copolymer, has a radial structure.

In one embodiment, the butadiene/styrene interpolymer, and preferably a butadiene/styrene copolymer, and more preferably a butadiene/styrene block copolymer, has a Shore A Hardness from 40 to 80, preferably from 50 to 70, and more preferably from 55 to 65 (ASTM D-2240).

In one embodiment, the butadiene/styrene interpolymer, and preferably a butadiene/styrene copolymer, and more preferably a butadiene/styrene block copolymer, has a toluene solution viscosity from 5 to 20, preferably from 8 to 15, and more preferably from 9 to 12 Pa-s (MA 04-3-064).

Suitable butadiene/styrene interpolymers, and preferably butadiene/styrene copolymers, and more preferably butadiene/styrene block copolymers, include CALPRENE copolymers, and preferably CALPRENE 401 butadiene/styrene copolymer, from Dynasol.

A butadiene/styrene interpolymer may comprise a combination of two or more embodiments as described herein.

A butadiene/styrene copolymer may comprise a combination of two or more embodiments as described herein.

A butadiene/styrene block copolymer may comprise a combination of two or more embodiments as described herein.

Additional examples of elastomeric rubbers include homopolymers of conjugated dienes, especially butadiene or isoprene, and random or block copolymers and terpolymers of at least one conjugated diene, for example, butadiene or isoprene, with at least one aromatic α-olefin, for example, styrene and 4-methylstyrene, and/or an aromatic diolefin, for example, divinylbenzene.

Additional examples of elastomeric rubbers include the following: BR—polybutadiene; ABR—butadiene/C1-C4-alkyl acrylate copolymers; HIPS—butadiene/styrene copolymers; CR—polychloroprene; IR—polyisoprene; natural rubber; SBR—styrene/butadiene copolymers; IIR—isobutylene/isoprene copolymers; NBR—butadiene/acrylonitrile copolymers; and HNBR—partially hydrogenated or fully hydrogenated NBR rubber.

Ethylene/α-Olefin/Diene Interpolymers (Component B)

In one embodiment, the elastomer is an ethylene/α-olefin/diene interpolymer.

The ethylene/α-olefin/diene interpolymers have polymerized therein C2 (ethylene), at least one α-olefin and a diene. Suitable examples of α-olefins include the C3-C20 α-olefins. Suitable examples of suitable dienes include the C4-C40 non-conjugated dienes.

The α-olefin is preferably a C3-C20 α-olefin, preferably a C3-C16 α-olefin, and more preferably a C3-C10 α-olefin. Preferred C3-C10 α-olefins are selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In one embodiment, the diene is a C6-C15 straight chain, branched chain or cyclic hydrocarbon diene. The diene is preferably a non-conjugated diene selected from ENB, dicyclopentadiene, 1,4-hexadiene, or 7-methyl-1,6-octadiene, and preferably, ENB, dicyclopentadiene or 1,4-hexadiene, more preferably ENB or dicyclopentadiene, and even more preferably ENB.

Some examples of ethylene/α-olefin/diene interpolymers include the NORDEL IP Hydrocarbon Rubbers from The Dow Chemical Company.

In a preferred embodiment, the ethylene/α-olefin/diene interpolymer comprises a majority amount of polymerized ethylene, based on the weight of the interpolymer.

In one embodiment of the invention, the ethylene/α-olefin/diene interpolymer has a molecular weight distribution (Mw/Mn) from 2 to 3, preferably from 2.05 to 2.8, and more preferably from 2.05 to 2.5, and even more preferably from 2.05 to 2.25. In a further embodiment, the interpolymer is an EPDM terpolymer. In a further embodiment, the diene is ENB.

In one embodiment, the ethylene/α-olefin/diene interpolymer has a Mooney Viscosity, ML(1+4) at 125° C., greater than 10, preferably greater than 30, more preferably greater than 50 (ASTM D 1646). In a further embodiment, the interpolymer is an EPDM terpolymer. In a further embodiment, the diene is ENB.

In one embodiment, the ethylene/α-olefin/diene interpolymer has a Mooney Viscosity, ML(1+4) at 125° C., less than 200, preferably less than, or equal to, 150, more preferably less than, or equal to, 100 (ASTM D 1646). In a further embodiment, the interpolymer is an EPDM terpolymer. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

In one embodiment, the ethylene/α-olefin/diene interpolymer has a density greater than, or equal to, 0.855 g/cc, preferably greater than, or equal to, 0.860 g/cc, more preferably greater than, or equal to, 0.865 g/cc. In a further embodiment, the interpolymer is an EPDM terpolymer. In a further embodiment, the diene is ENB.

In one embodiment, the ethylene/α-olefin interpolymer/diene has a density less than, or equal to, 0.910 g/cc, preferably less than, or equal to, 0.900 g/cc, more preferably less than, or equal to, 0.890 g/cc. In a further embodiment, the interpolymer is an EPDM terpolymer. In a further embodiment, the diene is ENB.

An ethylene/α-olefin/diene interpolymer, and preferably a terpolymer, may comprise a combination of two or more embodiments as described herein.

An ethylene/propylene/diene interpolymer, and preferably an EPDM terpolymer, may comprise a combination of two or more embodiments as described herein.

Ethylene/α-Olefin Interpolymers (Component B)

In one embodiment, the elastomer is an ethylene/α-olefin interpolymer. Ethylene/α-olefin interpolymers include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer has a density greater than, or equal to, 0.855 g/cc, preferably greater than, or equal to, 0.860 g/cc, more preferably greater than, or equal to, 0.870 g/cc. In a further embodiment, the ethylene/α-olefin interpolymer is an ethylene/α-olefin copolymer.

In one embodiment, the ethylene/α-olefin interpolymer has a density less than, or equal to, 0.910 g/cc, preferably less than, or equal to, 0.900 g/cc, more preferably less than, or equal to, 0.890 g/cc. In a further embodiment, the ethylene/α-olefin interpolymer is an ethylene/α-olefin copolymer.

In one embodiment, the ethylene/α-olefin interpolymer has a melt index (I2) greater than, or equal to, 0.1 g/10 min, preferably greater than, or equal to, 0.5 g/10 min, more preferably greater than, or equal to, 1 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 100 g/10 min, preferably less than, or equal to, 50 g/10 min, more preferably less than, or equal to, 20 g/10 min. In a further embodiment, the ethylene/α-olefin interpolymer is an ethylene/α-olefin copolymer.

In one embodiment, the ethylene/α-olefin interpolymer has molecular weight distribution (Mw/Mn) from 1.1 to 4, preferably from 1.1 to 3.5, more preferably from 1.1 to 3, as determined by GPC. In a further embodiment, the ethylene/α-olefin interpolymer is an ethylene/α-olefin copolymer.

In one embodiment, the ethylene/α-olefin interpolymer has a percent crystallinity of less than, or equal to, 30 percent, preferably less than, or equal to, 20 percent, and more preferably less than, or equal to, 15 percent, as measured by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 1 percent, preferably greater than, or equal to, 2 percent, as measured by DSC. In a further embodiment, the ethylene/α-olefin interpolymer is an ethylene/α-olefin copolymer.

In one embodiment, the ethylene/α-olefin interpolymer is a homogeneously branched linear interpolymer, and preferably a copolymer, or a homogeneous branched substantially linear interpolymer, and preferably a copolymer.

In one embodiment, the ethylene/α-olefin interpolymer is a homogeneously branched linear interpolymer, and preferably a copolymer.

In one embodiment, the ethylene/α-olefin interpolymer is a homogeneous branched substantially linear interpolymer, and preferably a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17,1301(1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

In one embodiment, the ethylene/α-olefin interpolymer has a PRR (Processing Rheology Ratio) greater than, or equal to, 4, preferably greater than, or equal to, 8, more preferably greater than, or equal to, 12, even more preferably greater than, or equal to, 15. In a further embodiment, the ethylene/α-olefin interpolymer is an ethylene/α-olefin copolymer.

In one embodiment, the ethylene/α-olefin interpolymer has a PRR from 4 to 70, preferably from 8 to 70. In a further embodiment, the ethylene/α-olefin interpolymer is an ethylene/α-olefin copolymer.

In one embodiment, the ethylene/α-olefin interpolymer has a PRR from 12 to 60, preferably from 15 to 55, and more preferably from 18 to 50. In a further embodiment, the ethylene/α-olefin interpolymer is an ethylene/α-olefin copolymer.

Interpolymer viscosity is conveniently measured in poise (dyne-second/square centimeter (d-sec/cm2)) at shear rates within a range of 0.1-100 radian per second (rad/sec), at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as "V0.1" and "V100," with a ratio of the two referred to as "RR," and expressed as "V0.1/V100."

The PRR value is calculated by the formula:

> PRR=RR+[3.82−interpolymer Mooney Viscosity (ML1+4 at 125° C.)]×0.3. The PRR determination is described in U.S. Pat. No. 6,680,361 (see also equivalent WO 00/26268), fully incorporated herein by reference.

An ethylene/α-olefin interpolymer may comprise a combination of two or more embodiments as described herein.

An ethylene/α-olefin copolymer may comprise a combination of two or more embodiments as described herein.

Ethylene/α-Olefin Multi-Block Interpolymers (Component B)

In one embodiment, the elastomer is an ethylene/α-olefin multi-block interpolymer, and preferably an ethylene/α-olefin multi-block copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

Ethylene/α-olefin multi-block interpolymers and copolymers may be made with two catalysts, incorporating differing quantities of comonomer, and a chain shuttling agent. An ethylene/α-olefin multi-block interpolymer, and preferably copolymer, has one or more of the following characteristics:

(1) an average block index greater than zero and up to about 1.0, and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -6553.3 + 13735(d) - 7051.7(d)^2; \text{ or}$$

(4) an Mw/Mn from about 1.7 to about 3.5, and is characterized by a heat of fusion, $\Delta H$ in J/g, and a delta quantity, $\Delta T$, in degrees Celsius, defined as the temperature difference between the tallest DSC peak and the tallest CRYSTAF peak, wherein the numerical values of $\Delta T$ and $\Delta H$ have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded coated substrate of the ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481−1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s), and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G' (100° C.) is in the range of about 1:1 to about 9:1.

In one embodiment, the ethylene/α-olefin multi-block interpolymer, and preferably copolymer, has one or more of characteristics (1) through (3), preferably (1) and (2), and more preferably (1).

The term "multi-block copolymer" or "segmented copolymer" refers to a polymer comprising two or more chemically distinct regions or segments (referred to as "blocks"), preferably joined in a linear manner, that is, a polymer comprising chemically differentiated units, which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In one embodiment, the ethylene/α-olefin multi-block interpolymer has a density of less than, or equal to, 0.900 g/cc, preferably less than, or equal to, 0.895 g/cc, more preferably less than, or equal to, 0.890 g/cc, even more preferably less than, or equal to, 0.885 g/cc. In a further embodiment, the ethylene/α-olefin multi-block interpolymer is an ethylene/α-olefin multi-block copolymer.

In one embodiment, the ethylene/α-olefin multi-block interpolymer has a density greater than, or equal to, 0.850 g/cc, preferably greater than, or equal to, 0.855 g/cc, and more preferably greater than, or equal to, 0.860 g/cc. Density is measured by the procedure of ASTM D-792-08. In a further embodiment, the ethylene/α-olefin multi-block interpolymer is an ethylene/α-olefin multi-block copolymer.

In one embodiment, the ethylene/α-olefin multi-block interpolymer has a melt index (I2) greater than, or equal to, 0.1 g/10 min, preferably greater than, or equal to, 0.5 g/10 min, and more preferably greater than, or equal to, 1 g/10 min, as determined using ASTM D-1238-04 (190° C., 2.16 kg load). In a further embodiment, the ethylene/α-olefin multi-block interpolymer is an ethylene/α-olefin multi-block copolymer.

In one embodiment, the ethylene/α-olefin multi-block interpolymer has a melt index (I2) less than, or equal to, 100 g/10 min, preferably less than, or equal to, 50 g/10 min, and more preferably less than, or equal to, 20 g/10 min, as determined using ASTM D-1238-04 (190° C., 2.16 kg load). In a further embodiment, the ethylene/α-olefin multi-block interpolymer is an ethylene/α-olefin multi-block copolymer.

In one embodiment, the ethylene/α-olefin multi-block interpolymer has a percent crystallinity of less than, or equal to, 40 percent, preferably less than, or equal to, 30 percent, and more preferably less than, or equal to, 20 percent, as determined by DSC. In a further embodiment, the ethylene/α-olefin multi-block interpolymer is an ethylene/α-olefin multi-block copolymer.

In one embodiment, the ethylene/α-olefin multi-block interpolymer has a percent crystallinity of greater than, or equal to, 2 percent, preferably greater than, or equal to, 5 percent, and more preferably greater than, or equal to, 10 percent, as determined by DSC. In a further embodiment, the ethylene/α-olefin multi-block interpolymer is an ethylene/α-olefin multi-block copolymer.

The ethylene multi-block copolymers and their preparation and use, are more fully described in WO 2005/090427, US2006/0199931, U.S. Pat. No. 7,6,08,668, US2006/0199914, US2006/0199912, U.S. Pat. No. 7,671,106, U.S. Pat. No. 7,579,408, US2006/0199908, U.S. Pat. No. 7,355,089, U.S. Pat. No. 7,622,529, U.S. Pat. No. 7,671,131, U.S. Pat. No. 7,524,911, U.S. Pat. No. 7,662,881, US 2006/0199887, U.S. Pat. No. 7,514,517, U.S. Pat. No. 7,666,918, U.S. Pat. No. 7,687,442, U.S. Pat. No. 7,582,716, U.S. Pat. No. 7,504,347 and US2006/0199983; each is incorporated herein by reference. Suitable ethylene multi-block copolymers are available as the INFUSE Olefin Block Copolymer, available from The Dow Chemical Company.

An ethylene/α-olefin multi-block interpolymer may comprise a combination of two or more embodiments as described herein.

An ethylene/α-olefin multi-block copolymer may comprise a combination of two or more embodiments as described herein.

Polydiene-Based and Polydiol-Based Polyurethanes (Component C)

Suitable polydiene-based polyurethanes and polydiol-based polyurethanes for use in the inventive compositions are described in International Publication No. WO 2008/057881, incorporated herein by reference. "Polydiene-based polyurethane," "diene-based polyurethane," "pd-TPU," and like terms, mean a polyurethane polymer formed, in part, from a polydiene containing at least one isocyanate-reactive group, e.g., hydroxyl and/or amine, preferably a hydroxyl group. "Polydiene diol-based polyurethane," "diene diol-based polyurethane," and like terms, mean a polyurethane polymer formed, in part, from a polydiene diol containing at least two hydroxyl groups. "Polydiol-based polyurethane," "diol-based polyurethane," "d-TPU," and like terms, mean a polyurethane polymer formed, in part, from a diol.

In one embodiment, component C) is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, component C) is a polydiol-based polyurethane. In a further embodiment, the polydiol-based polyurethane comprises at least one diol made from one or more seed oil triglycerides selected from the group consisting of palmitic, stearic, oleic, linoleic and linolenic acid or ester.

In one embodiment, the polydiene- or polydiol-based polyurethane contains a hard segment formed from a polydiisocyanate, in an amount from 20 to 40 weight percent, and preferably from 25 to 35 weight percent, based on the total weight of the polyurethane.

In one embodiment, the polydiene-based polyurethane is a polydiene diol-based polyurethane, and is formed from a composition comprising 15 to 40 weight percent of di-isocyanate, 50 to 75 weight percent of a polydiene diol, and 5 to 15 weight percent of a chain extender, each weight percent based on the total weight of the composition. In a further embodiment, the polydiene diol is a polybutadiene diol or a polyisoprene diol, and preferably is a polybutadiene diol. In a further embodiment, the di-isocyanate is an aliphatic or aromatic di-isocyanate, preferably an aromatic di-isocyanate, and more preferably 4,4'-diphenylmethane di-isocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol. In another embodiment, the polydiene diol is non-hydrogenated. In another embodiment, the polydiene diol is hydrogenated. In another embodiment, the polydiene diol is partially hydrogenated.

In one embodiment, the polydiol-based polyurethane is formed from a natural-sourced diol. As here used, "natural-sourced diol," "natural oil polyols," and like terms, mean a diol derived from an agricultural product, for example, seed oils such soy, sunflower, corn and canola. Such a diol may or may not contain dienic unsaturation. The composition of seed oil triglycerides is well understood. Triglycerides are fatty acid esters of glycerin, and the composition depends on the source of the oil. The nomenclature used is standard in the fats and oils industry, with the number of carbons in the fatty acid indicated first, followed by the number of sites of unsaturation in parentheses. Representative oils include palmitic, stearic, oleic, linoleic and linolenic. For the purpose of making polyols from these triglycerides, oils which contain a high level of unsaturation are desirable. Oils such as soy, canola and sunflower are acceptable due to the relatively low levels of saturated fatty acids that they contain, while feedstocks such as palm oil are considered unusable, without further purification or refinement, due to high levels of saturated fatty acids.

The polyurethane of Component C may be prepared from a polydiol or a functional polydiene containing at least one (preferably about two) "isocyanate-reactive group(s)" attached at the ends of the molecule or attached pendantly within the molecule. This functionality may be any of the groups that react with isocyanates to form covalent bonds. This functionality preferably contains "active hydrogen atoms," with typical examples being hydroxyl, amino (primary amines, secondary amines), sulfhydryl, and mixtures thereof. The term "active hydrogen atoms" refers to hydrogen atoms that, because of their placement in a molecule, display activity according to the Zerewitinoff test, as described by Kohler in J. Am. Chemical Soc., 49, 31-81 (1927), incorporated herein by reference. The content of the unsaturated segment in the polyurethane is from 1 to 95 weight percent, preferably from 5 to 70 weight percent, and preferably from 10 to 50 weight percent, based on the total weight of the polyurethane. In a preferred embodiment, the polyurethane component is prepared from a polydiene diol. In another embodiment, the polyurethane is prepared from a functionalized polydiene, which contains "isocyanate reactive groups" other than hydroxyl.

One method for preparing such functional polydienes is a two-step process in which a conjugated diene is grown by anionic polymerization from both ends of a difunctional initiator. The molecular weight of the polydiene is controlled by the molar ratio of the conjugated diene to the initiator. In the second step, the ends are then capped with alkylene oxide (such as ethylene oxide or propylene oxide) to produce an unsaturated diol. This particular process is described in U.S. Pat. No. 4,039,593, incorporated herein by reference. In such processes, it is possible to add excess alkylene oxide and form short poly(alkylene oxide) chains at the ends of the polydiene. Such materials are within the scope of this invention.

In one embodiment, a conjugated dienes containing from 4 to 24 carbons, and preferably from 4 to 8 carbons, is used to prepare the functional polydiene. Typical dienes include butadiene and isoprene, and typical functional polydienes are polybutadiene and polyisoprene, each capped at each end with ethylene oxide. These polydienes have at least one functional group per molecule, and typically have a number average molecular weight (Mn) from 500 to 10,000 grams per mole (g/mol), and preferably from 500 to 5,000 g/mol. The functional group is preferably a hydroxyl group. Two preferred polydiene diols are polybutadiene diol and polyisoprene diol, and more preferably polybutadiene diol.

In one embodiment, the polydiene diol-based polyurethane is formed from a non-hydrogenated polydiene diol. In another embodiment, the polydiene diol-based polyurethane is formed from a hydrogenated polydiene diol. In another embodiment, the at least one polydiene diol-based polyurethane is formed from a partially hydrogenated polydiene diol.

The term "hydrogenation" is known in the art, and is used in reference to the hydrogenation (reaction of hydrogen with alkene groups) of double bonds within the polydiene diol, and is in reference to the final (hydrogenated) product. The term "hydrogenation" refers to the complete hydrogenation of all the double bonds, or the near complete hydrogenation (approximately greater than 95 mole percent) of the double bonds, within the polydiene diol. The term "partial hydrogenation," is used in reference to a hydrogenation reaction, and the final product, both in which a significant amount (approximately greater than 5 mole percent) of the double bonds, within the polydiene diol, are not hydrogenated.

The polyurethane (Component C) may be prepared by reacting the functional polydiene with an isocyanate and optionally a chain extender. In the 'prepolymer' method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, preferably from 10,000 to 500,000 g/mol, and more preferably from 20,000 to 100,000 g/mol.

Some examples of polydiene diols, and corresponding polyurethanes, are described in Pytela et al, "Novel Polybutadiene Diols for Thermoplastic Polyurethanes," International Polyurethane Conference, PU Lat. Am. 2001; and in Pytela et al, "Novel Thermoplastic Polyurethanes for Adhesives and Sealants," Adhesives & Sealant Industry, June 2003, pp. 45-51; each fully incorporated herein by reference. Some examples of some hydrogenated polydiene diols, and corresponding polyurethanes, are described in WO 99/02603, and corresponding European Patent EP 0 994 919 B1; each fully incorporated herein by reference. As discussed in these references, the hydrogenation may be carried out by a variety of established processes, including hydrogenation in the presence of catalysts as Raney Nickel, noble metals, such as platinum, soluble transition metal catalysts and titanium catalysts, as in U.S. Pat. No. 5,039,755, fully incorporated herein by reference. Also, the polymers may have different diene blocks and these diene blocks may be selectively hydrogenated as described in U.S. Pat. No. 5,229,464, fully incorporated herein by reference.

Preferred di-isocyanates include, but are not limited to, 4,4'-di-isocyanato-diphenylmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. In one embodiment, the di-isocyanate is 4,4'-di-isocyanato-diphenylmethane.

Di-isocyanates also include aliphatic and cycloaliphatic isocyanate compounds, such as 1,6-hexamethylene-di-isocyanate; ethylene di-isocyanate; 1-isocyanato-3,5,5-trimethyl-1-3-isocyanatomethylcyclohexane; 2,4- and 2,6-hexahydro-toluenedi-isocyanate, as well as the corresponding isomeric mixtures; 4,4'-, 2,2'- and 2,4'-dicyclohexyl-methanedi-isocyanate, as well as the corresponding isomeric mixtures. Also, 1,3-tetramethylene xylene di-isocyanate can be used with the present invention. The isocyanate may be selected from organic isocyanates, modified isocyanates, isocyanate-based pre-polymers, and mixtures of two or more of these isocyanates.

In one embodiment, the polydiene-based polyurethane and, preferably, a polydiene diol-based polyurethane, is formed from at least one aliphatic or cyclo-aliphatic diisocyanate.

In one embodiment, the polydiol-based polyurethane is formed from at least one aliphatic or cyclo-aliphatic diisocyanate. In a further embodiment, the polydiol-based polyurethane comprises at least one diol made from one or more seed oil triglycerides, selected from the group consisting of palmitic, stearic, oleic, linoleic and linolenic acid or ester.

The other main component of the polyurethanes is the chain extender. Examples of suitable chain extenders include those described above for Component A. In one embodiment, the extender is a diol.

Optionally, catalysts that will promote or facilitate the formation of urethane groups may be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N,N'-tetramethyl-1,3-butanediamine, bis[2-(N,N-dimethylamino)ethyl]ether, 1,4-diazabicyclo[2.2.2]octane; zirconium chelates, aluminum chelates and bismuth carbonates. The catalysts, when used, are typically employed in catalytic amounts that may range from 0.001 weight percent, and lower, to 2 weight percent, and higher, based on the total amount of polyurethane-forming ingredients.

In a preferred embodiment of the invention, the polyurethane is formed from a polydiene diol, an isocyanate and a chain extender, and preferably an aliphatic chain extender (for example, an aliphatic diol). In another embodiment, the polydiene diol-based polyurethane is hydrogenated.

In one embodiment, the polydiene diol-based polyurethane is formed from a composition comprising 15 to 40 weight percent of di-isocyanate, 50 to 75 weight percent of a polydiene diol, and 5 to 15 weight percent of a chain extender, based on the weight of the composition. In a further embodiment, the polydiene diol is a polybutadiene diol or a polyisoprene diol, and preferably is a polybutadiene diol. In a further embodiment, the di-isocyanate is an aliphatic or aromatic di-isocyanate, and more preferably 4,4' -diphenylmethane di-isocyanate. In yet a further embodiment, the chain extender is an aliphatic diol. In another embodiment, the polydiene diol has a Mn from 500 to 10,000, more preferably from 1,000 to 5,000, and even more preferably from 1,500 to 3,000, g/mol. In another embodiment, the polydiene diol is non-hydrogenated. In another embodiment, the polydiene diol is hydrogenated. In another embodiment, the polydiene diol is partially hydrogenated.

In one embodiment, the polydiene-based polyurethane is present in an amount less than, or equal to, 20 weight percent, preferably less than, or equal to, 10 weight percent, more preferably less than, or equal to, 6 weight percent, based on the total weight of the composition.

In one embodiment, the polydiene-based polyurethane is present in an amount greater than, or equal to, 0.5 weight percent, preferably greater than, or equal to, 1 weight percent, more preferably greater than, or equal to, 2 weight percent, based on the total weight of the composition.

In one embodiment, the polydiene-based polyurethane has a density from 0.90 g/cc to 1.30 g/cc, preferably from 0.95 g/cc to 1.25 g/cc, more preferably from 1.00 g/cc to 1.20 g/cc.

In one embodiment, the polydiene-based polyurethane has a melt index (I2) from 1 g/10 min to 300 g/10 min, preferably from 2 g/10 min to 200 g/10 min (ASTM D-1238-04, 190° C., 2.16 kg).

In one embodiment, polydiene-based polyurethane is formed from a composition that comprises 15 to 40 weight percent of a diisocyanate, based on the total weight of the composition. In a further embodiment, the diisocyanate is an aromatic diisocyanate.

In one embodiment, the polydiene-based polyurethane is formed from a composition that comprises from 50 to 75 weight percent of a polydiene diol, based on the total weight of the composition.

In one embodiment, the polydiene-based polyurethane is formed from a composition that comprises from 5 to 15 weight percent of a chain extender, based on the total weight of the composition.

In one embodiment, the polydiol-based polyurethane is present in an amount less than, or equal to, 20 weight percent, preferably less than, or equal to, 10 weight percent, more preferably less than, or equal to, 6 weight percent, based on the total weight of the composition.

In one embodiment, the polydiol-based polyurethane is present in an amount greater than, or equal to, 0.5 weight percent, preferably greater than, or equal to, 1 weight percent, more preferably greater than, or equal to, 2 weight percent, based on the total weight of the composition.

In one embodiment, the polydiol-based polyurethane has a density from 0.90 g/cc to 1.30 g/cc, preferably from 0.95 g/cc to 1.25 g/cc, more preferably from 1.00 g/cc to 1.20 g/cc.

In one embodiment, the polydiol-based polyurethane has a melt index (I2) from 1 g/10 min to 300 g/10 min, preferably from 2 g/10 min to 200 g/10 min (ASTM D-1238-04, 190° C., 2.16 kg).

In one embodiment, polydiol-based polyurethane is formed from a composition that comprises 15 to 40 weight percent of a diisocyanate, based on the total weight of the composition. In a further embodiment, the diisocyanate is an aromatic diisocyanate.

In one embodiment, the polydiol-based polyurethane is formed from a composition that comprises from 50 to 75 weight percent of a polydiol diol, based on the total weight of the composition.

In one embodiment, the polydiol-based polyurethane is formed from a composition that comprises from 5 to 15 weight percent of a chain extender, based on the total weight of the composition.

A polydiene-based polyurethane may comprise a combination of two or more embodiments as described herein.

A polydiol-based polyurethane may comprise a combination of two or more embodiments as described herein.

Polyoctenamer (Component D)

In one embodiment, the polyoctenamer is formed from a reaction mixture comprising cyclooctene. In a further embodiment, the polyoctenamer is formed from a metathesis reaction of cyclooctene.

In one embodiment, the polyoctenamer comprises cyclic macromolecules, linear macromolecules, or mixtures thereof.

In one embodiment, the polyoctenamer has a glass transition temperature (Tg) from −50° C. to −80° C., preferably from −60° C. to −75° C. (ISO 6721).

In one embodiment, the polyoctenamer has a melting temperature (Tm) from 20° C. to 70° C., preferably from 30° C. to 65° C., more preferably from 50° C. to 60° C. (DSC).

In one embodiment, the polyoctenamer has a percent crystallinilty from 5 to 50 percent, preferably from 10 to 40 percent, more preferably from 25 to 35 percent (DSC).

In one embodiment, the polyoctenamer has a Mooney Viscosity (ML (1+4) at 100° C.) less than, or equal to, 20, preferably less than, or equal to, 10.

In one embodiment, the polyoctenamer has a density from 0.87 to 0.93 g/cc, preferably from 0.88 to 0.92 g/cc, more preferably from 0.89 to 0.91 g/cc (DIN 53479A).

Suitable polyoctenamers include VESTENAMER High Performance Polymers (Evonik Industries (formerly Degussa)), preferably VESTENAMER 8012 and VESTENAMER 6213, and more preferably VESTENAMER 8012.

In one embodiment, the polyoctenamer is selected from VESTENAMER 8012, VESTENAMER 6213, or mixtures thereof.

A polyoctenamer may comprise a combination of two or more embodiments as described herein.

Resin (Component E)

Suitable resins are selected from the group consisting of the following:

i) an indene-coumarone resin,
ii) an aromatic hydrocarbon resin, and
iii) an aliphatically modified aromatic hydrocarbon resin.

In one embodiment, the resin is selected from the group consisting of the following:
i) an indene-coumarone resin, and
ii) an aromatic hydrocarbon resin.

In one embodiment, the resin is selected from the group consisting of the following:
i) an indene-coumarone resin, and
iii) an aliphatically modified aromatic hydrocarbon resin.

In one embodiment, the resin is selected from the group consisting of the following:
ii) an aromatic hydrocarbon resin, and
iii) an aliphatically modified aromatic hydrocarbon resin.

Suitable resins include NOVARES Resins (Rüetgers Chemicals AG), preferably NOVARES C90, NOVARES TT90 and NOVARES TK90 resins.

In one embodiment, the indene-coumarone resin is a polymerizate of "coal tar-derived" unsaturated aromatic C9/C10 hydrocarbons.

In one embodiment, the indene-coumarone resin has a softening point from 80° C. to 105° C., preferably from 82° C. to 100° C., more preferably from 85° C. to 95° C. (ASTM 3461, Ring and Ball).

In one embodiment, the indene-coumarone resin has a density from 0.90 to 1.25 g/cc, preferably from 1.00 to 1.20 g/cc, more preferably from 1.10 to 1.15 g/cc (DIN 52004, 20° C.).

In one embodiment, the indene-coumarone resin is NOVARES C90 resin.

In one embodiment, the resin is an indene-coumarone resin

In one embodiment, the aromatic hydrocarbon resin is a polymerizate of unsaturated aromatic C9/C10 hydrocarbons.

In one embodiment, the aromatic hydrocarbon resin has a softening point from 80° C. to 105° C., preferably from 82° C. to 100° C., more preferably from 85° C. to 95° C. (ASTM 3461, Ring and Ball).

In one embodiment, the aromatic hydrocarbon resin has a density from 0.90 to 1.25 g/cc, preferably from 1.00 to 1.20 g/cc, more preferably from 1.05 to 1.15 g/cc (DIN 52004, 20° C.).

In one embodiment, the aromatic hydrocarbon resin is NOVARES TT90 resin.

In one embodiment, the resin is an aromatic hydrocarbon resin.

In one embodiment, the aliphatically modified aromatic hydrocarbon resin has a softening point from 80° C. to 105° C., preferably from 82° C. to 100° C., more preferably from 85° C. to 95° C. (ASTM 3461, Ring and Ball).

In one embodiment, the aliphatically modified aromatic hydrocarbon resin has a density from 0.90 to 1.25 g/cc, preferably from 1.00 to 1.20 g/cc, more preferably from 1.05 to 1.15 g/cc (DIN 52004, 20° C.).

In one embodiment, the aliphatically modified aromatic hydrocarbon resin is NOVARES TK90 resin.

In one embodiment, the resin is an aliphatically modified aromatic hydrocarbon resin.

A resin (Component E) may have a combination of two or more embodiments as described herein.

An indene-coumarone resin may have a combination of two or more embodiments as described herein.

An aromatic hydrocarbon resin may have a combination of two or more embodiments as described herein.

An aliphatically modified aromatic hydrocarbon resin may have a combination of two or more embodiments as described herein.

Applications

The invention provides an article comprising at least one component formed from an inventive composition. Articles include, but are not limited to, sheets, injection molded articles, laminated articles, overmolded articles, footwear articles, automotive parts, computer parts, furniture, wheel and tires, and toys.

This invention can be used for where it is desirable to use an injectable material for goods with good grip and abrasion resistance, like small wheels, trolley wheels, wheelchair wheels, and similar applications. The inventive compositions are also used for shoe soles, or other goods, with a unique balance of abrasion resistance, hardness and specific gravity.

The invention provides for an injection molded article comprising at least one component formed from an inventive composition.

The invention also provides for a footwear article comprising at least one component formed from an inventive composition. In a further embodiment, the article is selected from the group consisting of shoe outsole, shoe midsole, shoe unitsole, an overmolded article, a natural leather article, a synthetic leather article, an upper, a laminated article, a coated article, a boot, a sandal, galoshes, a plastic shoe, and combinations thereof.

Definitions

The term "composition," as used herein, includes a mixture of materials which comprise the composition, as well as reaction products and decomposition products formed from the materials of the composition.

"Blend," "polymer blend," and like terms, as used herein, refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin. As used in the context of this disclosure, ethylene/α-olefin interpolymer excludes ethylene/α-olefin multi-block interpolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. As used in the context of this disclosure, ethylene/α-olefin copolymer excludes ethylene/α-olefin multi-block copolymers.

The term "polydiene-based polyurethane," "diene-based polyurethane," and like terms, refer to a polyurethane polymer formed, in part, from a polydiene containing at least one isocyanate-reactive group, for example, hydroxyl and/or amine.

The term "polydiol-based polyurethane," "diol-based polyurethane," and like terms, refer to a polyurethane polymer formed, in part, from a polydiol containing at least two hydroxyl groups.

The term "polydiene diol-based polyurethane," "diene diol-based polyurethane," and like terms, refer to a polyurethane polymer formed, in part, from a polydiene containing at least two hydroxyl groups.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Experimental

The following components were used in the formulations shown in Table 1.

TPU 80 is a thermoplastic urethane (80 Shore A hardness) available from Goldenplast s.p.a. (density of 1.19 g/cc (ISO 1183)).

EUROPRENE Sol T 172 is an oil extended SBS from Polimeri Europa.

CALPRENE 401 is an 80/20 butadiene-styrene radial thermoplastic copolymer from Dynasol.

SARTOMER 2035 is a polybutadiene thermoplastic polyurethane, from Sartomer Company Inc.

VESTENAMER 8012 is a polyoctenamer from Evonik Industries (formerly Degussa).

NOVARES C90 is a coumarone-indene hydrocarbon resin, from Rüetgers Chemicals AG.

NOVARES TT90 is an aromatic hydrocarbon resin, from Rüetgers Chemicals AG.

NOVARES TK90 is an aliphatic modified aromatic hydrocarbon resin, from Rüetgers Chemicals AG.

INFUSE 9100 is a Olefin Block Copolymer, from The Dow Chemical Company

The formulations were mixed in a twin screw extruder (temperatures from 170° C. to 200° C.). The extruded formulations were injected molded into plaques (thickness from 2 mm to 3 mm), using a reciprocating screw injection machine, with set temperature of 160° C. and a mold temperature of 30° C. For each test method, a plaque was cut to the appropriate test specimen dimension.

The melt flow index (MFI) of each formulation, and the mechanical properties of each injection molded formulation are shown in Table 1.

TABLE 1

| | Test Method | Comp. Ex. A | Comp. Ex. B | Comp. Ex. C | Ex. 1 | Ex. 2 | Ex. 3 |
|---|---|---|---|---|---|---|---|
| CALPRENE 401 | | 40 | 20 | 30 | 30 | 30 | 30 |
| EUROPRENE SOL T172 | | — | 20 | — | — | — | — |
| TPU 80 Shore A | | 55 | 55 | 55 | 55 | 55 | 55 |
| Sartomer 2035 | | 5 | 5 | 5 | 5 | 5 | 5 |
| INFUSE 9100 | | — | — | 10 | — | — | — |
| VESTENAMER 8012 | | — | — | — | 6 | 6 | 6 |
| NOVARES C 90 | | — | — | — | 4 | — | — |
| NOVARES TT 90 | | — | — | — | — | 4 | — |
| NOVARES TK 90 | | — | — | — | — | — | 4 |
| Density (g/cc) | | 1.060 | 1.053 | 1.056 | 1.064 | 1.064 | 1.063 |
| MFI (5 kg at 190° C.) | | 10 | 15 | 15 | 16 | 24 | 22 |
| Tensile strength (MPa) | DIN 53504 | 19.0 | 18.8 | 18.8 | 19.0 | 18.2 | 17.3 |
| Percent Elongation at Break | DIN 53504 | 750 | 718 | 718 | 695 | 687 | 675 |
| Abrasion Resistance (mm³) | DIN 53516 | 98 | 90 | 90 | 52 | 47 | 45 |
| Tear (n/mm) | DIN 53515 | 46 | 55 | 55 | 53 | 54 | 55 |
| Hardness Shore A (3 s) | DIN 53505 | 70 | 70 | 70 | 70 | 70 | 70 |

As shown in Table 1, the Inventive Examples 1-3 had improved (higher) MFI and improved (lower) abrasion compared to Comparative Examples A-C.

Although the invention has been described in considerable detail in the preceding examples, this detail is for the purpose of illustration, and is not to be construed as a limitation on the invention, as described in the following claims.

The invention claimed is:

1. A composition comprising at least the following:
   A) a thermoplastic polyurethane;
   B) an elastomer;
   C) a polydiene-based polyurethane or a polydiol-based polyurethane;
   D) a polyoctenamer; and
   E) a resin selected from the group consisting of the following:
      i) an indene-coumarone resin,
      ii) an aromatic hydrocarbon resin, and
      iii) an aliphatically modified aromatic hydrocarbon resin.

2. The composition of claim 1, wherein the elastomer of Component B is selected from the group consisting of the following: an elastomeric rubber, an ethylene/α-olefin/diene interpolymer, an ethylene/α-olefin interpolymer, and an ethylene/α-olefin multi-block interpolymer.

3. The composition of claim 1, wherein the elastomer of Component B is a butadiene/styrene copolymer.

4. The composition of claim 3, wherein the butadiene/styrene copolymer is a butadiene/styrene block copolymer.

5. The composition of claim 1, wherein Component C is a polydiene-based polyurethane.

6. The composition of claim 1, wherein Component C is a polydiol-based polyurethane.

7. The composition of claim 1, wherein Component E is an indene-coumarone resin.

8. The composition of claim 1, wherein Component E is an aromatic hydrocarbon resin.

9. The composition of claim 1, wherein Component E is an aliphatically modified aromatic hydrocarbon resin.

10. The composition of claim 1, wherein the polyurethane of Component A is present in an amount from 10 to 90 weight percent, based on the weight of the composition.

11. The composition of claim 1, wherein the elastomer of Component B is present in an amount from 10 to 90 weight percent, based on the weight of the composition.

12. The composition of claim 1, wherein the polydiene-based polyurethane or polydiol-based polyurethane of Component C is present in an amount from 0.1 to 20 weight percent, based on the weight of the composition.

13. The composition of claim 1, wherein the polyoctenamer of Component D is present in an amount from 0.1 to 30 weight percent, based on the weight of the composition.

14. The composition of claim 1, wherein the resin Component E is present in an amount from 0.1 to 30 weight percent, based on the weight of the composition.

15. An article comprising at least one component formed from the composition of claim 1.

16. The article of claim 15, wherein the article is selected from the group consisting of the following: sheets, injection molded articles, laminated articles, overmolded articles, footwear articles, automotive parts, computer parts, furniture, wheel and tires, and toys.

* * * * *